(12) United States Patent
Chen

(10) Patent No.: US 6,693,403 B2
(45) Date of Patent: Feb. 17, 2004

(54) POWER FAILURE TOLERANT MOTOR DRIVES FOR DUAL VOLTAGE SYSTEMS

(75) Inventor: Shaotang Chen, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 2 days.

(21) Appl. No.: 10/068,524

(22) Filed: Feb. 5, 2002

(65) Prior Publication Data

US 2003/0146730 A1 Aug. 7, 2003

(51) Int. Cl.[7] .................................................. H02P 7/36
(52) U.S. Cl. ..................... 318/701; 254/770; 254/748; 254/724; 320/121; 320/126; 320/DIG. 13
(58) Field of Search ................................. 318/701, 254, 318/138, 439, 770, 748, 724; 320/121, 126, DIG. 13

(56) References Cited

U.S. PATENT DOCUMENTS

| | | | | |
|---|---|---|---|---|
| 3,560,818 A | * | 2/1971 | Amato | 318/139 |
| 3,956,678 A | * | 5/1976 | Byrne et al. | 318/138 |
| 4,045,718 A | * | 8/1977 | Gray | 320/7 |
| 4,112,345 A | * | 9/1978 | Goddijn | 318/696 |
| 4,348,619 A | * | 9/1982 | Ray et al. | 318/139 |
| 4,387,326 A | * | 6/1983 | Ray et al. | 318/138 |
| 4,563,619 A | * | 1/1986 | Devis et al. | 318/138 |
| 4,707,650 A | | 11/1987 | Bose | 318/685 |
| 5,075,610 A | * | 12/1991 | Harris | 318/701 |
| 5,548,196 A | | 8/1996 | Lim | 318/701 |
| 5,729,112 A | | 3/1998 | Blackburn | 318/701 |

* cited by examiner

Primary Examiner—Rina I. Duda
(74) Attorney, Agent, or Firm—Michael D. Smith

(57) ABSTRACT

A dual voltage motor drive is disclosed. In an exemplary embodiment, the motor includes a rotor assembly, rotatingly disposed within a stator assembly, and a plurality of motor phase windings configured to be energized in a determined sequence to cause a rotation of the rotor assembly. The plurality of motor phase windings are divided into a first group of windings selectively energized by a first voltage source, and a second group of windings selectively energized by a second voltage source, wherein the motor remains operational in the event of a failure of one of the first and second voltage sources.

28 Claims, 8 Drawing Sheets

POWER FAILURE TOLERANT MOTOR DRIVES FOR DUAL VOLTAGE SYSTEMS

BACKGROUND

The present disclosure relates generally electric motor drives and, more particularly, to a motor drive topology having a built-in power failure tolerant capability when implemented in a dual voltage system such as a dual voltage motor vehicle.

In certain motor vehicle systems, such as electric power steering systems, steer and brake by wire systems, electric caliper systems and the like, both hardware and software redundancies are commonly implemented to provide a desired fault tolerant capability. A tradeoff, however, to such redundant features is the cost penalty associated therewith. For example, an electric motor used in a motor vehicle system (such as mentioned above) may utilize both a primary power source, as well as a backup power source to improve the fault tolerant capability.

With dual voltage electrical systems being developed for future motor vehicles, such as the emerging 14 Volt/42 Volt system for example, the opportunity exists for using both of the dual voltage supplies to provide power to redundant systems, including those systems employing electric motors. Accordingly, in the event of a failure of one of the power sources, a motor could maintain its operation through the surviving power source. At present, however, this would be accomplished through traditional methods such as including additional power switching or backup circuitry. The backup circuitry may even require a separate DC to DC converter for the transition between power supplies. Although this approach to system redundancy increases overall system reliability, additional hardware is used thereby driving up the total cost of the system.

SUMMARY

The above discussed and other drawbacks and deficiencies of the prior art are overcome or alleviated by a dual voltage motor drive and associated configured circuitry for power failure tolerance. In an exemplary embodiment, the motor drive includes a rotor assembly, rotatingly disposed within a stator assembly, and a plurality of motor phase windings configured to be energized in a determined sequence to cause a rotation of the rotor assembly. The plurality of motor phase windings are divided into a first group of windings selectively energized by a first voltage source, and a second group of windings selectively energized by a second voltage source, wherein the motor remains operational in the event of a failure of one of the first and second voltage sources.

In a preferred embodiment, the first group of windings is cross coupled to the second voltage source and the second group of windings is cross coupled to the first voltage source. In addition, a first capacitor is connected in parallel with the first voltage source and a second capacitor is connected in parallel with the second voltage source. Thereby, the second capacitor is charged by current flowing through the first group of windings, while the first capacitor is charged by current flowing through the second group of windings.

In one embodiment, both the first and second group of windings include at least one bifilar winding, wherein each bifilar winding includes a primary coil and a secondary coil, the secondary coil being magnetically coupled to the primary coil. The primary coil in each bifilar winding is energized by applying a phase control signal to a gate of a transistor connected to the primary coil, thereby causing an input current to flow through the primary coil in a first direction. Responsive to the removal of the phase control signal, the secondary coil in each bifilar winding has an output current flowing therethrough in a second direction opposite to the first direction. Each secondary coil in each bifilar winding further has a diode connected thereto, thereby preventing the flow of current through each secondary coil in the first direction. The first and second capacitors are charged by the output current flowing in the secondary coils of the bifilar windings.

BRIEF DESCRIPTION OF THE DRAWINGS

Referring to the exemplary drawings wherein like elements are numbered alike in the several Figures.

DETAILED DESCRIPTION

Figure 1:
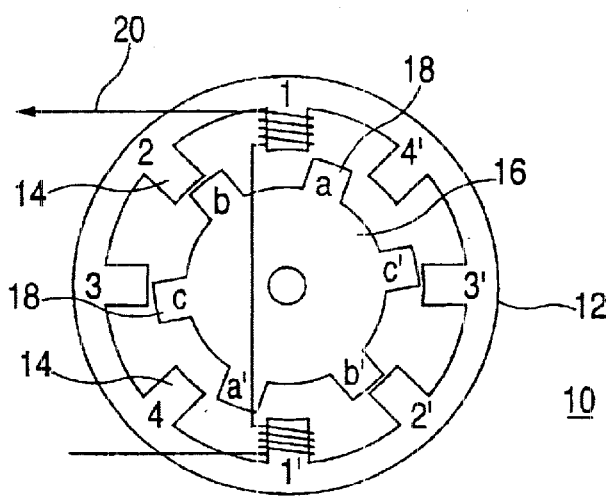
FIG. 1 is a diagrammatic, cross-sectional view of an existing switched reluctance motor suitable for use in connection with an embodiment of the invention.

Referring initially to FIG. 1, there is shown in cross-section the primary components of a switched reluctance SR motor 10. Although the following invention embodiments will be described in the context of an SR motor, it will be understood that the novel principles discussed herein are equally applicable to other existing electric motor structures such as permanent magnet motors, induction motors, and other brushless motors in general wherein commutation is accomplished electrically.

Motor 10 includes a stator assembly 12 having a number of salient stator poles 14 associated therewith. Each stator pole 14 is paired with another diametrically opposite stator pole 14 to form a stator pole pair. The number of stator pole pairs determines the number of phases of the motor 10. In the embodiment depicted, the stator assembly 12 has four pole pairs, designated by 1-1', 2-2', 3-3' and 4-4'. Although a greater or lesser number of pole pairs may be utilized, it is preferred that stator assembly 12 include an even number of pole pairs, as will be described later. In one possible embodiment, the stator assembly 12 further includes a plurality of laminations (not shown) made of a magnetically permeable material, such as iron.

A rotor assembly 16 also includes a plurality of salient rotor poles 18 formed on an outer surface thereof. As is the case with the stator poles 14, the rotor poles 18 are also preferably provided in diametrically opposed pairs. Although six rotor poles 18 (three rotor pole pairs) are shown on the illustrated rotor assembly 16, it should be appreciated that a greater or a lesser number of rotor poles 18 may be used in any particular configuration. However, for SR motors in general, the number of rotor poles 18 differs from the number of stator poles 14, as is well known. The three rotor pole pairs are depicted in FIG. 1 as a-a', b-b' and c-c'. Each stator pole pair is provided with a machine or motor phase winding 20 connected serially across the pole pair. For ease of illustration, only one motor phase winding 20 is shown in FIG. 1, and is connected across stator pole pair 1-1'. As will be described, each phase winding 20 is preferably a bifilar winding having a primary coil and a secondary coil.

Figure 2:
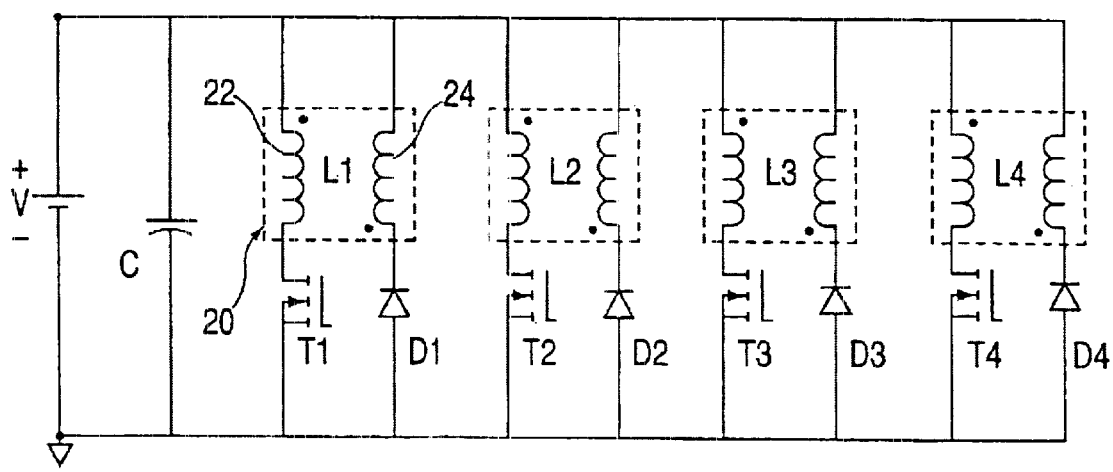
FIG. 2 is a schematic diagram of phase control circuitry associated with the existing motor shown in FIG. 1.

FIG. 2 is a schematic diagram illustrating one possible configuration of a phase control circuit for operating the motor 10. A voltage source, V, is used to energize each of the four phase windings in accordance with a sensed rotor position. The individual control circuits for each phase winding are also known in the art as converters or converter circuits. While voltage source V is shown as a direct current (DC) source, it will be understood that an alternating current (AC) source may alternatively be used to supply power to the motor 10. A capacitor, C, may also be used to provide a smooth, filtered DC source across the phase windings 20, which are individually designated as L1 through L4.

Each phase winding 20 is a bifilar winding having a primary coil 22, wound in a first direction, and a secondary coil 24 wound in the opposite direction, as indicated by the oppositely oriented dotted terminals on the respective coils. A first end of each primary coil 22 is connected to the positive bus of the voltage source V, while a second end of each primary coil 22 is connected to a switch (individually designated T1 through T4). In the embodiment depicted, the switches T1 through T4 are n-channel field effect transistors operated in the enhancement mode. Each transistor has a drain terminal thereof connected to the second end (i.e., non-dotted end) of the corresponding primary coil 22 and a source terminal connected to the negative (grounded) bus of voltage source V. A control or gate terminal in each transistor receives a phase commutation signal for energizing and deenergizing the respective phase winding.

In addition, a first end of each secondary coil 24 is also connected to the positive bus of voltage source V, while a second end of each secondary coil 24 is connected to a diode (individually designated D1 through D4). As will be explained, each diode is included in order to substantially inhibit the flow of current from the positive bus of voltage source V to ground by way of the secondary coils 24.

Because the operation of each of the phase windings is essentially the same, only one (L1) will be described in detail for the sake of simplicity. During normal operation of motor 10, the transistor T1 is turned on and off through a phase commutation signal applied to the gate thereof by a controller (not shown). Thus, when the winding L1 of stator pole pair 1-1' is initially energized by an appropriate signal on the gate of T1, current is drawn through primary coil 22 of phase winding L1. An attractive force is thereby generated between stator pole pair 1-1' and the nearest rotor pole pair, a-a', causing a counterclockwise rotation of the rotor assembly 16. At a determined rotor position, the current to L1 is deactivated by the controller and the next phase winding (L2) is thereafter energized to continue the rotation of the rotor assembly 16.

The phase windings 20, being energy storage devices, resist instantaneous changes in current. Accordingly, when T1 is turned off, stored energy is still present within winding L1. In order to limit the effects of a negative torque or braking torque from any residual current in the primary coil 22, the secondary coil 24 is used to dissipate the energy in L1 by returning a portion thereof to the source (i.e., voltage source V). This is accomplished by the opposite winding direction of the secondary coil 24 with respect to the primary coil 22. The current initially drawn by primary coil 22 in L1 creates a magnetic flux therein which is coupled to secondary coil 24, thereby inducing a voltage thereacross in a polarity opposite to that of the primary coil. Preferably, the number of turns in the secondary coil 24 is greater than the number of turns in the primary coil 22 so that the induced voltage at the dotted terminal of the secondary coil 24 is greater than the voltage of voltage source V. The configuration of diode D1 is such that the direction of current through secondary coil is from the ground bus of voltage supply V, through D1, to the positive bus of voltage supply V.

Again, the converter circuitry for the other phase windings also operates as explained above. When operated in a sequential manner, the converter circuitry for each of the phase windings 20 thus allows the motor 10 to be rotated in either a forward or a reverse direction, depending upon the sequence that transistors T1 through T4 are switched on and off.

As mentioned previously, a motor such as described above may be incorporated into a control system that is desired to maintain a certain level of fault tolerance. That is, in the event of a failure of the power supply to the motor, a backup source would be available to allow the motor to continue to operate within the context of the system. As also indicated previously, however, conventional methods of providing fault tolerant motor drives (e.g., a backup power supply and switching circuitry) are generally costly to implement. Accordingly, a lower cost alternative is desired.

Figure 3:
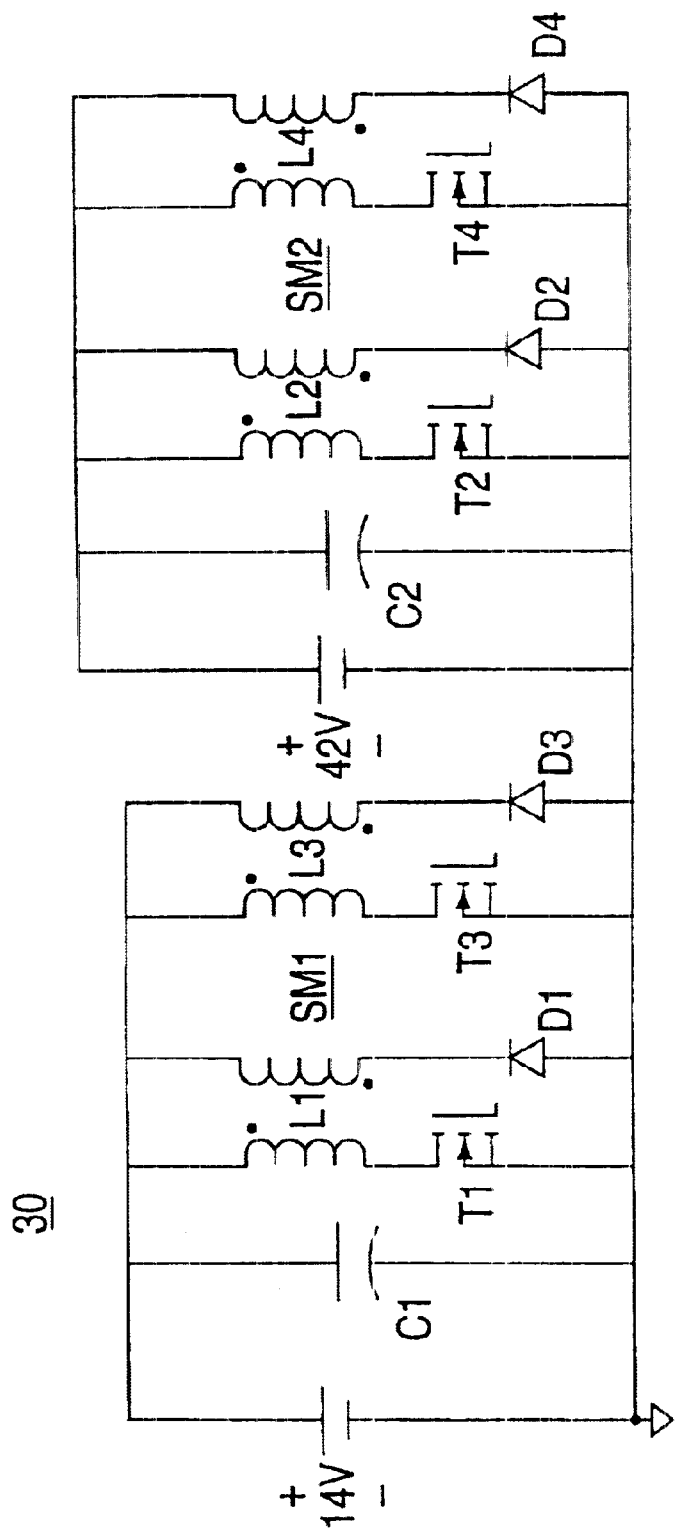
FIG. 3 is a schematic diagram of a dual voltage motor and associated control circuitry, in accordance with an embodiment of the invention.

Referring now to FIG. 3, there is shown a schematic diagram of a dual voltage motor 30 and associated control circuitry, in accordance with an embodiment of the invention. Briefly stated, the motor 30 is configured to operate with two separate voltage supplies simultaneously connected thereto. Although motor 30 in FIG. 3 is shown to have a 14 volt voltage source and a 42 volt voltage source (such as may be found in newer vehicle systems), this is depicted by way of example only, and those skilled in the art will appreciate that different voltage values may be used for both voltage supplies.

Instead of having a primary voltage supply and a backup voltage supply (along with associated switching circuitry and/or a DC to DC converter), the phase windings of motor 30 are modified and divided into two "sub motors", SM1 and SM2, wherein the motor phases in SM1 are powered by the 14 volt source and the motor phases in SM2 are powered by the 42 volt source. Thus, in the example shown, two of the motor phase windings, L1 and L3, are included in SM1 while the other two phase windings, L2 and L4, are included in SM2. Again, a preferred embodiment will include an even number of stator pole pairs (and thus an even number of phases) to simplify the drive design and division of phase windings into the submotors. It should be noted that in order to produce a relatively constant torque, each group of windings, SM1 and SM2, should be proportionally designed with regard to the operating voltages thereof.

In a normal operating condition, the motor 30 is run in a similar manner to conventional SR motor 10, in that the phase windings around the stator poles may be energized in a sequential manner so as to cause rotation of the salient rotor poles. However, unlike a conventional SR motor (without a separate backup supply), motor 30 may lose one of the two voltage sources and still continue to run without interruption. For example, if the 14 volt source were lost, motor 30 would continue to run due to the continued energization of phase windings L2 and L4 in SM2 through the 42 volt source. Similarly, if the 42 volt source were lost, motor would continue to run due to the continued energization of phase windings L1 and L3 in SM1 through the 14 volt source.

Figure 4:
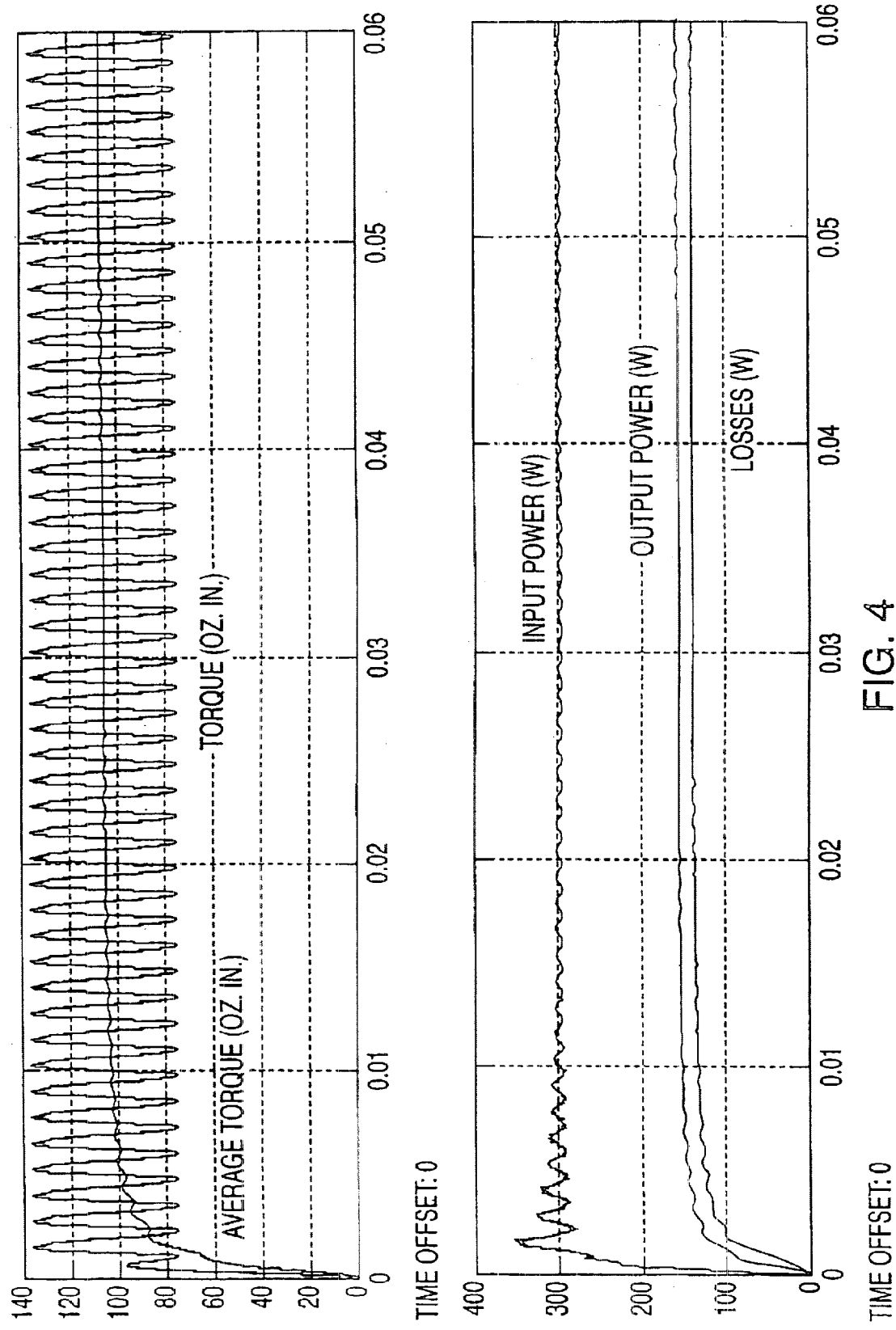
FIG. 4 is a graph illustrating output torque and power for the motor of FIG. 3 when both voltage supplies thereto are fully operational.
Figure 5:
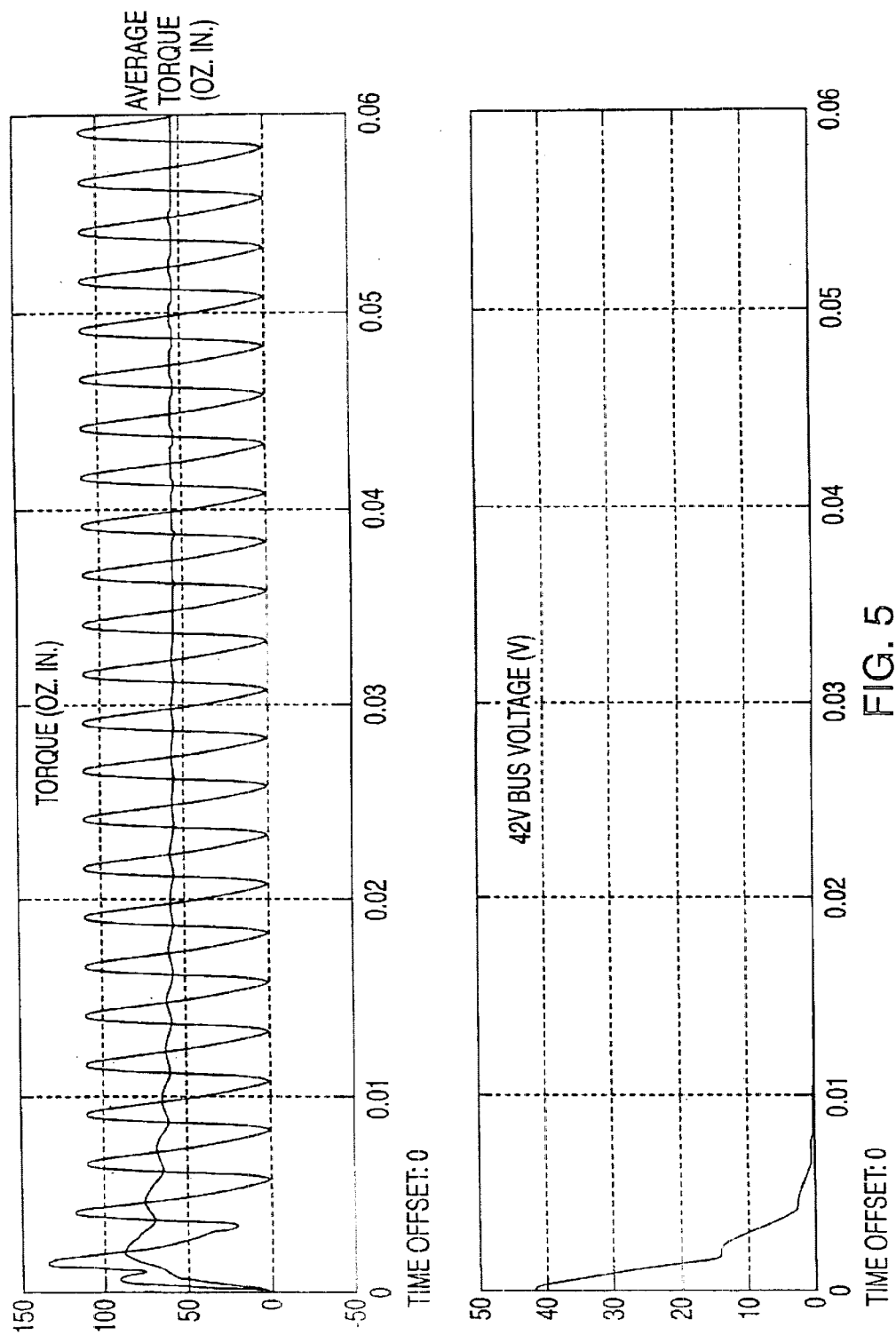
FIG. 5 is a graph illustrating the output torque of the motor of FIG. 3 when the 42 volt voltage supply thereto is disabled.
Figure 6:
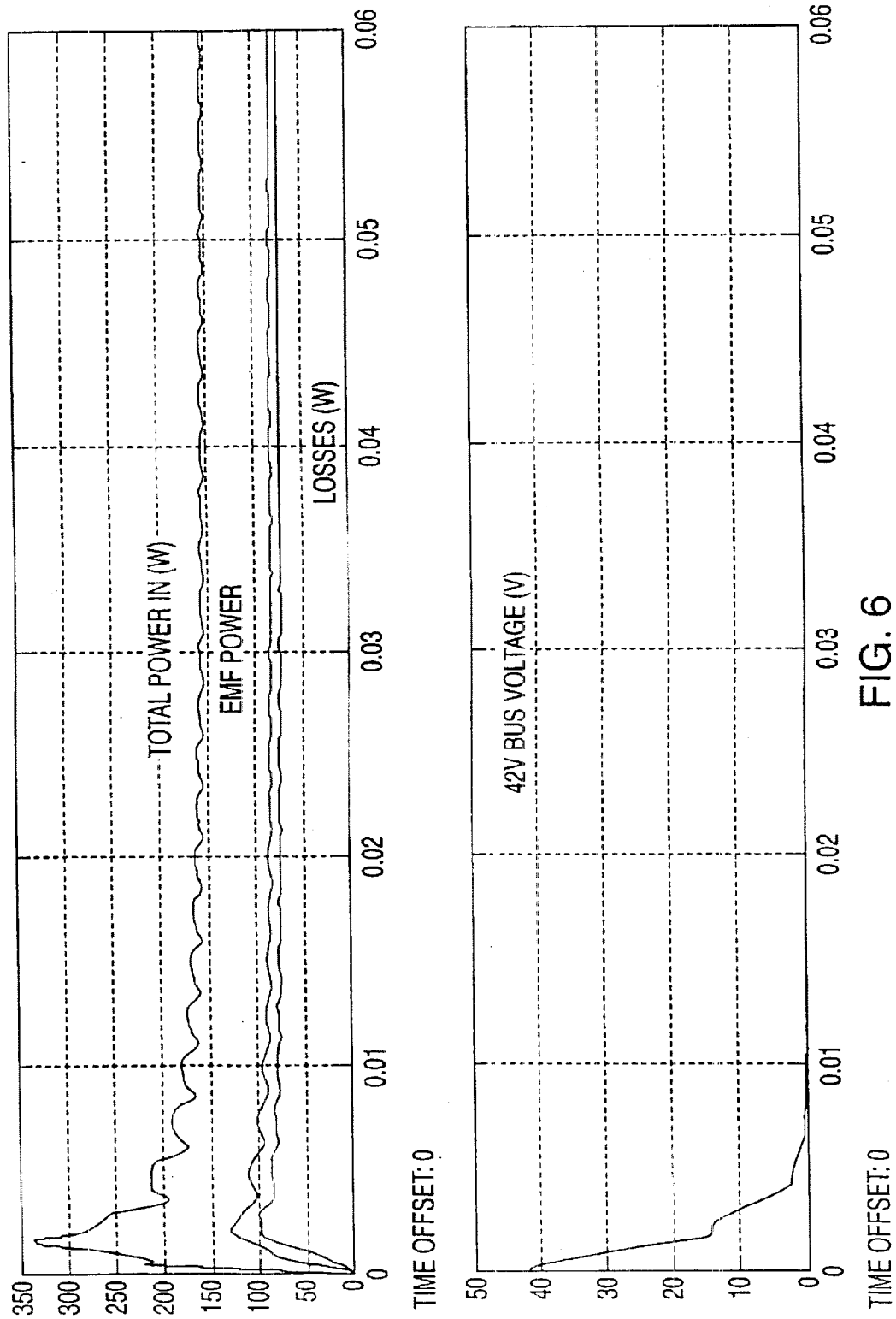
FIG. 6 is a graph illustrating the output power of the motor of FIG. 3 when the 42 volt voltage supply thereto is disabled.

FIGS. 4 through 6 are graphs that illustrate a comparison between a normally operating motor configured according to FIG. 3 and the motor when the 42 volt source is lost. The upper graph in FIG. 4 represents the output torque of motor 30 with both the 14 volt source and the 42 volt source connected thereto. The lower graph in FIG. 4 compares the input and output power. As can be seen, the motor 30 in a normal operating condition produces an average rated torque of about 105 ounce-inches, with an input power of about 300 watts (W) and an output power of about 160 W.

FIG. 5 illustrates the effect on output torque during an outage of the 42 volt source. Once the bus voltage drops to zero (as shown in the lower graph), the resulting output torque shown in the upper graph drops by about 50% as compared to FIG. 4. In addition, as shown in FIG. 6, the resulting output power of motor 30 is also reduced by about 50%.

Although it has been shown that motor 30, thus configured, will continue to run in the event of a loss of one of the two voltage supplies, it is still desirable to limit the resulting loss of output torque and power in such a case. Therefore, in accordance with a further embodiment, an alternative motor configuration 70 is depicted generally in FIG. 7. In this embodiment, a cross-coupling is provided between the secondary coils of the phase windings in each sub motor with the power supply of the other sub motor. Thereby, if one of the voltage supplies is lost, the specific phase windings associated therewith may nevertheless still be energized through a stored voltage on a capacitor. The capacitor has a voltage maintained thereon by the discharge currents of the secondary coils of the phase windings connected to the "good" voltage supply.

Figure 7:
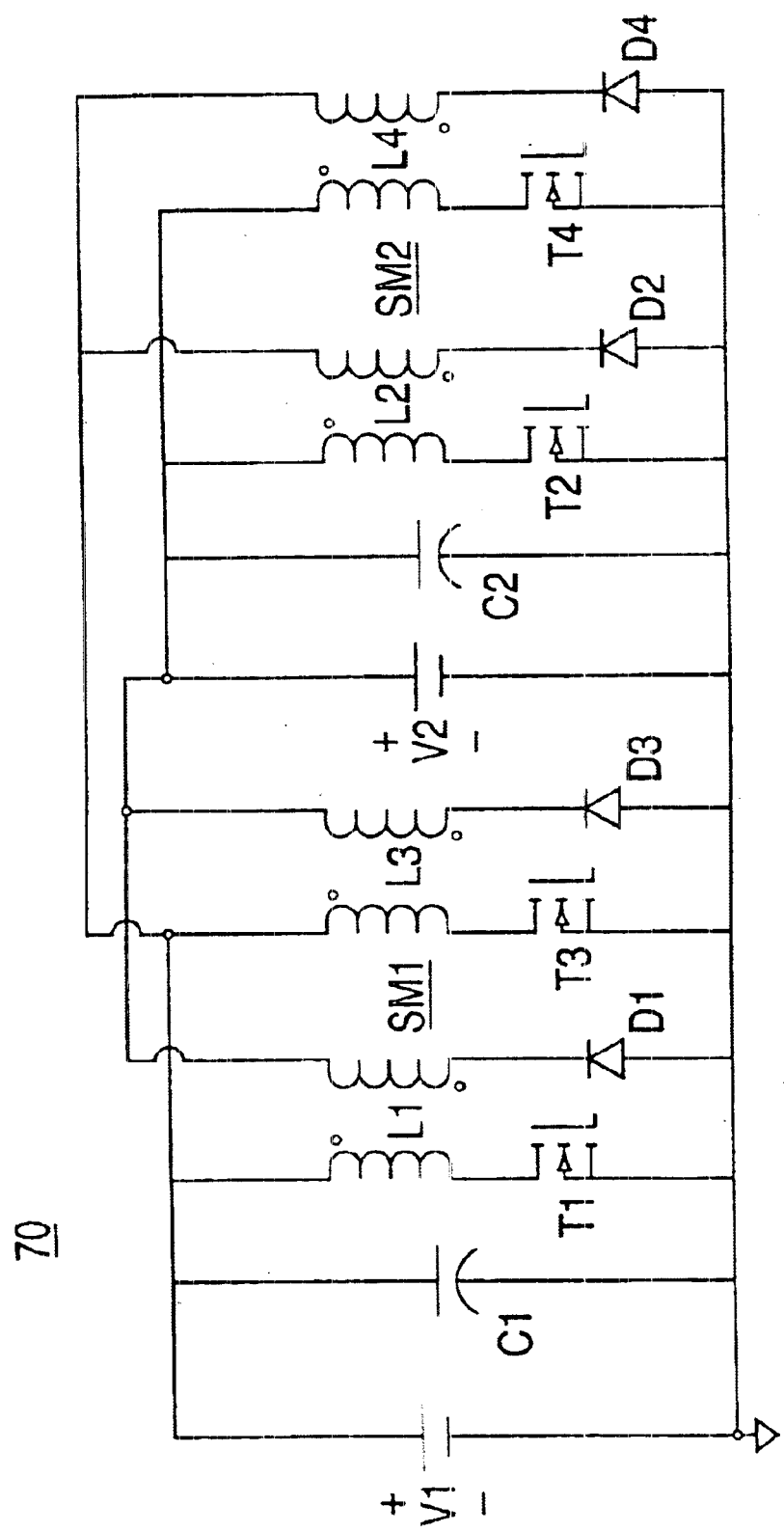
FIG. 7 is a schematic diagram of a general configuration for the dual voltage motor, in accordance with an alternative embodiment of the invention.

The operation of motor 70 is understood with specific reference to FIG. 7. For purposes of illustration only, the dual voltage sources are depicted generally as V1 and V2, wherein V1 and V2 may have any arbitrary voltages. With V1 and V2 operating normally, the sequential energization of each phase winding is the same as described earlier. However, the cross-coupling allows energy to flow from one DC bus to the other. Thus, in the event of a loss of V2 (for example), the output current from L1 and L3 in SM1 flows through forward biased diodes D1 and D3, respectively, to charge capacitor C2. As a result, the stored energy in C2 is used to energize windings L2 and L4 as T2 and T4 continue to be cycled on and off. Accordingly, SM2 continues to contribute to the overall torque and power output of the motor, even though V2 is disabled. Similarly, in the event of a loss of V1, the output current from L2 and L4 in SM2 flows through forward biased diodes D2 and D4 to charge capacitor C1.

In applying the general motor schematic shown FIG. 7 to a 14 Volt/42 volt, dual voltage system, the motor configuration may be simplified. Because of the potential difference between the two voltage supplies, bifilar windings are used only in conjunction with the phase windings (L2 and L4) in SM2, connected to the 42 volt supply. The phase windings (L1 and L3) in SM1, on the other hand, are single windings as depicted by the motor 80 schematic in FIG. 8. When transistor T1 (and T3) is switched off after being switched on, the diode D1 (and D3) is forced to conduct current due to the continuity of current in L1. The negative voltage (12V–42V) seen across winding L1 (and L3) is large enough to demagnetize the winding. On the other hand, when transistor T2 (and T4) is turned off, a bifilar winding is used to induce a negative voltage across L2 (and L4). Otherwise, the energy stored in L2 and L4 would remain therein, or even accumulate for an undesired period of time, thus resulting in a braking torque or other negative effects on the motor operation.

Figure 8:
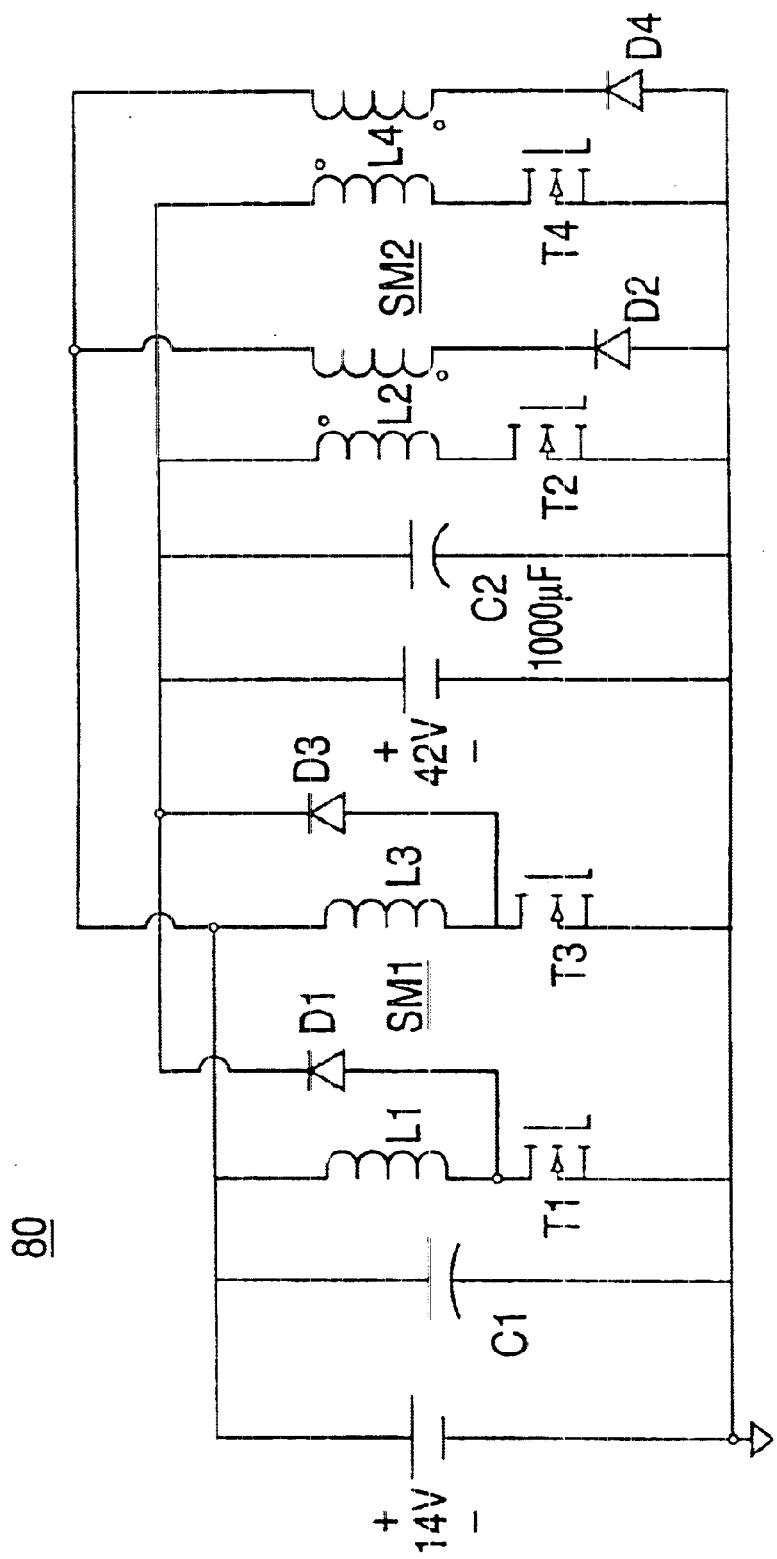
FIG. 8 is a schematic diagram of a specific, 14 Volt/42 Volt configuration of the dual voltage motor in FIG. 7.
Figure 9:
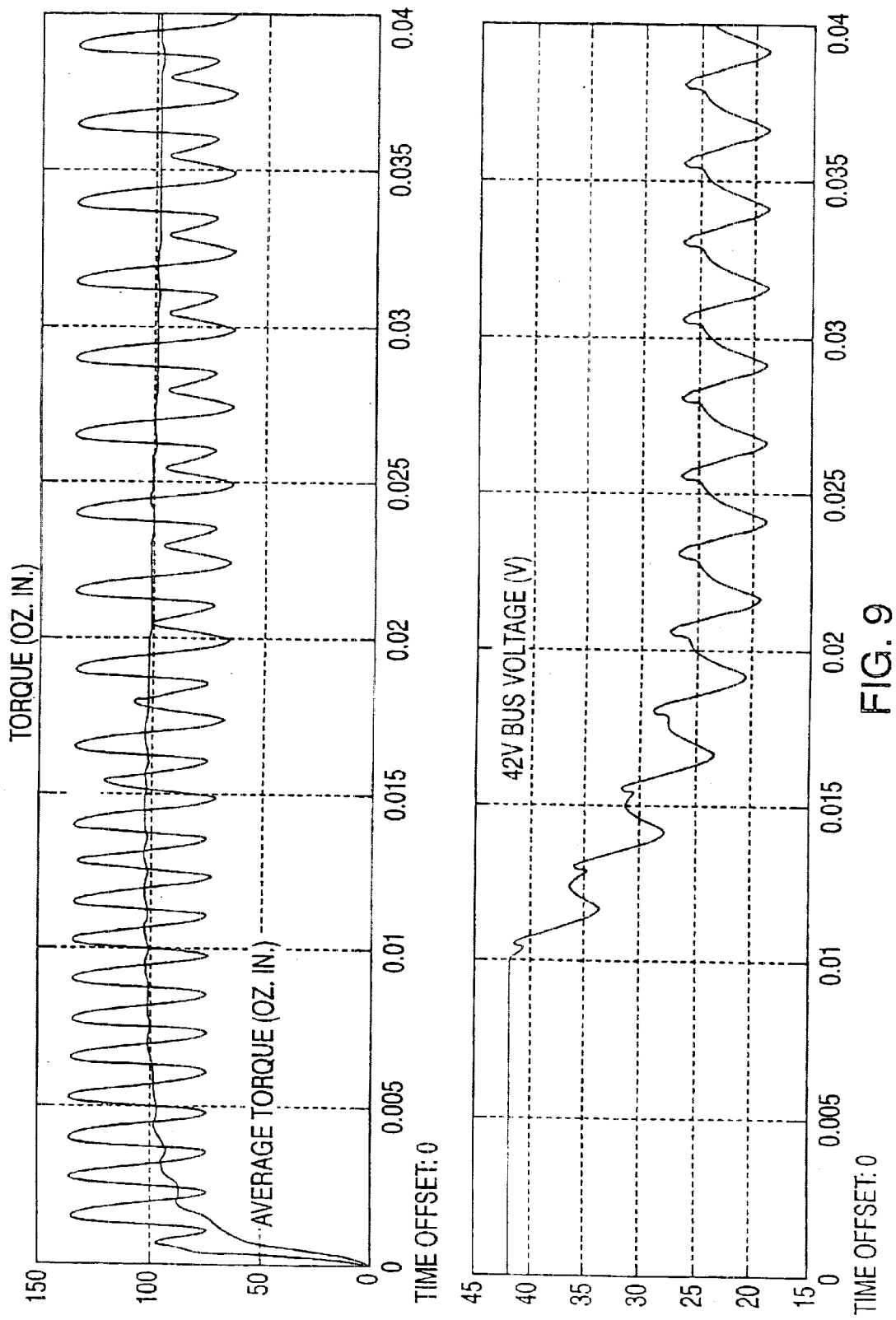
FIG. 9 is a graph illustrating output torque for the motor of FIG. 8 when the 42 Volt voltage source is disabled.

Finally, FIG. 9 is a graph illustrating the resulting torque output of the motor 80 configured according to FIG. 8, with the 42 V voltage source disabled. As a result of the cross coupling of sub motors SM1 and SM2, the average output torque is only reduced from about 105 ounce-inches (FIG. 5) to about 93 ounce-inches, representing a drop of about 11.4% as compared to a drop of about 50% without cross coupling. In the lower graph of FIG. 9, it is seen that the bus voltage for the 42 V supply is maintained at an average voltage of about 22 V by capacitor C2. This sustained performance is maintained without the need for any intervening control or switching circuitry.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A dual voltage motor drive, comprising:
  a rotor assembly rotatingly disposed within a stator assembly;
  a plurality of motor phase windings, said phase windings configured to be energized in a determined sequence to cause a rotation of said rotor assembly; and
  said plurality of motor phase windings being divided into a first group of windings selectively energized by a first voltage source, and a second group of windings selectively energized by a second voltage source;
  wherein the motor remains operational in the event of a failure of one of said first and second voltage sources.

2. The dual voltage motor drive of claim 1, wherein each of said plurality of phase windings comprises a bifilar winding having a primary coil and a secondary coil, said secondary coil magnetically coupled to said primary coil.

3. The dual voltage motor drive of claim 2, wherein:
  said primary coil in each said bifilar winding is energized by applying a phase control signal to a gate of a transistor connected to said primary coil, thereby causing an input current to flow through said primary coil in a first direction; and
  responsive to the removal of said phase control signal, said secondary coil in each said bifilar winding has an output current flowing there through in a second direction opposite to said first direction.

4. The dual voltage motor drive of claim 3, wherein:
each said secondary coil in each said bifilar winding has a diode connected thereto, thereby preventing the flow of current through each said secondary coil in said first direction.

5. The dual voltage motor drive of claim 1, further comprising a switched reluctance (SR) type motor.

6. A dual voltage motor drive, comprising:
a rotor assembly rotatingly disposed within a stator assembly;
a plurality of motor phase windings, said phase windings configured to be energized in a determined sequence to cause a rotation of said rotor assembly;
said plurality of motor phase windings being divided into a first group or windings selectively energized by a first voltage source, and a second group of windings selectively energized by a second voltage source;
said first group of windings being cross coupled to said second voltage source; and
said second group of windings being cross coupled to said first voltage source;
wherein the motor remains operational in the event of a failure of one of said first and second voltage sources.

7. The dual voltage motor drive of claim 6, further comprising:
a first capacitor connected in parallel with said first voltage source and a second capacitor connected in parallel with said second voltage source; wherein
said second capacitor is charged by current flowing through said first group of windings; and
said first capacitor is charged by current flowing through said second group of windings.

8. The dual voltage motor drive of claim 7, wherein:
said first group of windings includes at least one bifilar winding; and
said second group of windings includes at least one bifilar winding;
wherein each said bifilar winding includes a primary coil and a secondary coil, said secondary coil being magnetically coupled to said primary coil.

9. The dual voltage motor drive of claim 8, wherein:
said primary coil in each said bifilar winding is energized by applying a phase control signal to a gate of a transistor connected to said primary coil, thereby causing an input current to flow through said primary coil in a first direction; and
responsive to the removal of said phase control signal, said secondary coil in each said bifilar winding has an output current flowing there through in a second direction opposite to said first direction.

10. The dual voltage motor drive of claim 9, wherein:
each said secondary coil in each said bifilar winding has a diode connected thereto, thereby preventing the flow of current through each said secondary coil in said first direction.

11. The dual voltage motor drive of claim 10, wherein said first and second capacitors are charged by said output current flowing in said secondary coils of said bifilar windings.

12. The dual voltage motor drive of claim 7, wherein:
the supply voltage of said second voltage source is larger than the supply voltage of said first voltage source.

13. The dual voltage motor drive of claim 12, wherein:
said second group of windings includes at least one bifilar winding, and each said at least one bifilar winding includes a primary coil and a secondary coil, said secondary coil being magnetically coupled to said primary coil.

14. The dual voltage motor drive of claim 13, wherein:
said primary coil in each said at least one bifilar winding is energized by applying a phase control signal to a gate of a transistor connected to said primary coil, thereby causing an input current to flow through said primary coil in a first direction; and
responsive to the removal of said phase control signal, said secondary coil in each said at least one bifilar winding has an output current flowing there through in a second direction opposite to said first direction.

15. The dual voltage motor drive of claim 14, wherein said first capacitor is charged by said output current flowing in said secondary coil of each said at least one bifilar winding.

16. The dual voltage motor drive of claim 7, wherein:
said second group of windings includes bifilar windings; and
the voltage supply of said second voltage source is larger than the voltage supply of said first voltage source.

17. A method for configuring a fault tolerant motor, the method comprising:
configuring a rotor assembly to be rotatingly disposed within a stator assembly, said stator assembly having a plurality or motor phase windings to be energized in a determined sequence to cause a rotation of said rotor assembly; and
dividing said plurality of motor phase windings divided into a first group of windings to be selectively energized by a first voltage source, and a second group of windings to be selectively energized by a second voltage source;
wherein the motor remains operational in the event of a failure of one of said first and second voltage sources.

18. The method of claim 17, further comprising:
cross coupling said first group of windings to said second voltage source; and
cross coupling said second group of windings to said first voltage source.

19. The method of claim 18, further comprising:
connecting a first capacitor in parallel with said first voltage source and a second capacitor in parallel with said second voltage source; wherein
said second capacitor is charged by current flowing through said first group of windings; and
said first capacitor is charged by current flowing through said second group of windings.

20. The method of claim 19, wherein:
said first group of windings includes at least one bifilar winding; and
said second group of windings includes at least one bifilar winding;
wherein each said bifilar winding includes a primary coil and a secondary coil, said secondary coil being magnetically coupled to said primary coil.

21. The method of claim 20, wherein:
said primary coil in each said bifilar winding is energized by applying a phase control signal to a gate of a transistor connected to said primary coil, thereby causing an input current to flow through said primary coil in a first direction; and
responsive to said primary current, said secondary coil in each said bifilar winding has an output current flowing there through in a second direction opposite to said first direction.

22. The method of claim 21, wherein:
each said secondary coil in each said bifilar winding has a diode connected thereto, thereby preventing the flow of current through each said secondary coil in said first direction.

23. The method of claim 22, wherein said first and second capacitors are charged by said output current flowing in said secondary coils of said bifilar windings.

24. The method of claim 19, wherein:

the supply voltage of said second voltage source is larger than the supply voltage of said first voltage source.

25. The method of claim 24, wherein:

said second group of windings includes at least one bifilar winding, and each said at least one bifilar winding includes a primary coil and a secondary coil, said secondary coil being magnetically coupled to said primary coil.

26. The method of claim 25, wherein:

said primary coil in each said at least one bifilar winding is energized by applying a phase control signal to a gate of a transistor connected to said primary coil, thereby causing an input current to flow through said primary coil in a first direction; and responsive to said primary current, said secondary coil in each said at least one bifilar winding has an output current flowing there through in a second direction opposite to said first direction.

27. The method of claim 26, wherein said first capacitor is charged by said output current flowing in said secondary coil of each said at least one bifilar winding.

28. The method of claim 19, wherein:

said second group of windings includes bifilar windings; and the voltage supply of said second voltage source is larger than the voltage supply of said first voltage source.

* * * * *